313-302 SR
2/3/87 OR H 000,216

United States Statutory Invention Registration [19]

[11] Reg. Number: H216

Piggin [43] Published: Feb. 3, 1987

[54] METHOD FOR AND PRODUCT OF ELECTRON EMISSIVE LAYER AND MULTIBEAM CRT THEREBY

[76] Inventor: Bruce P. Piggin, Birch Lake, North Common, Sherfield English, Hants, England

[21] Appl. No.: 733,004

[22] Filed: May 10, 1985

Related U.S. Application Data

[63] Continuation of Ser. No. 612,197, May 21, 1984, abandoned, which is a continuation of Ser. No. 279,281, Jun. 30, 1981, abandoned.

[51] Int. Cl.[4] ..... H01J 1/46; H01J 21/10; H01J 29/50

[52] U.S. Cl. ..... 313/302; 313/304; 313/309; 313/409

*Primary Examiner*—S. C. Buczinski
*Assistant Examiner*—Linda J. Wallace

[57] ABSTRACT

An encapsulated planar cathode structure is formed for a vacuum tube. A multibeam cathode ray tube is obtained by heating in the CRT such a structure with a plurality of separated electron emissive layers to remove the encapsulation material. Positive photoresist technology is utilized: for obtaining delineated apertures on a planar metallization layer supported by an insulating substrate into which needle-shaped carbonate particles are deposited electrophoretically normal to the metallization; and for encapsulating the resultant cathodes.

1 Claim, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

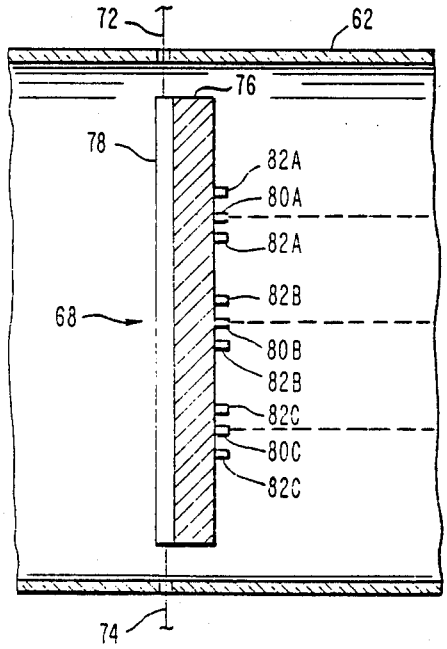

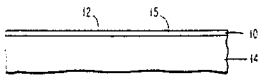

PRIOR ART
FIG. 1.1
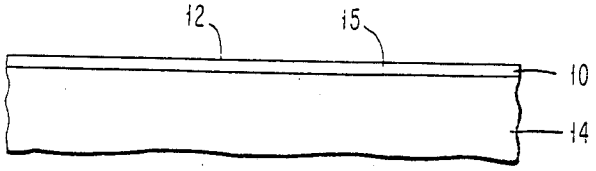
FIG. 1.2
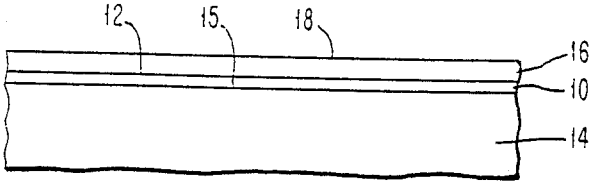
FIG. 1.3
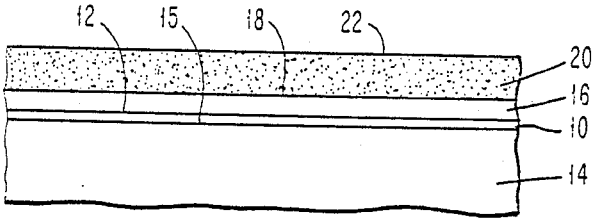
FIG. 1.4
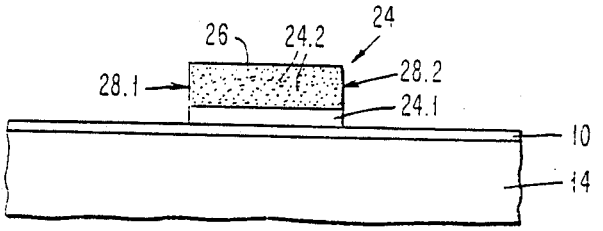
FIG. 1.5
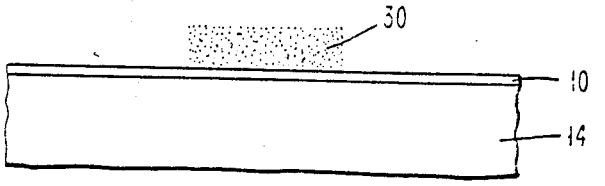

FIG. 2.1
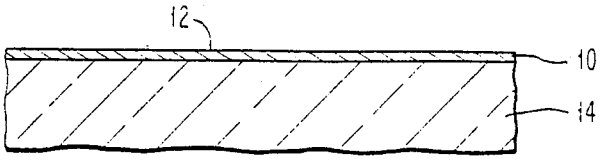
FIG. 2.2
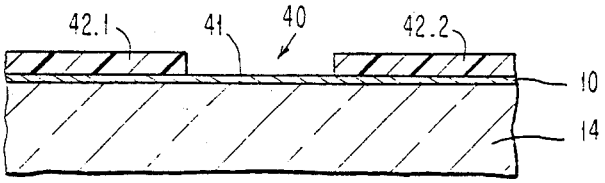
FIG. 2.3
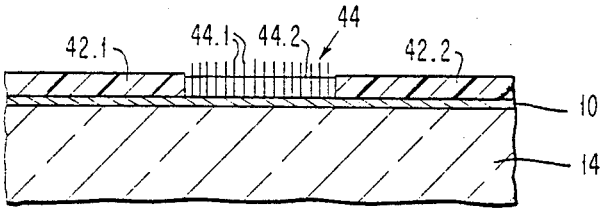
FIG. 2.4
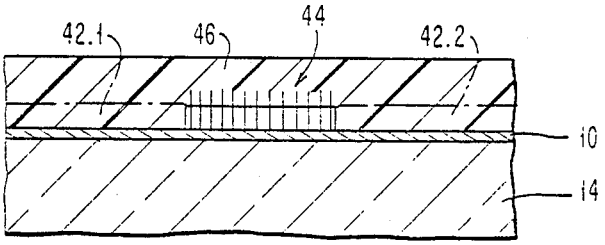
FIG. 2.5
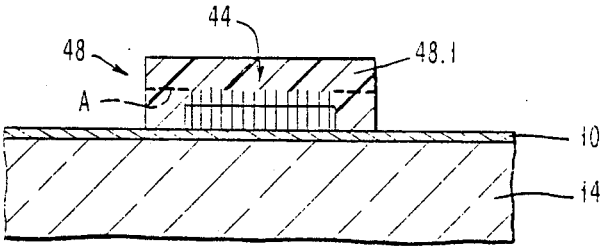
FIG. 2.6
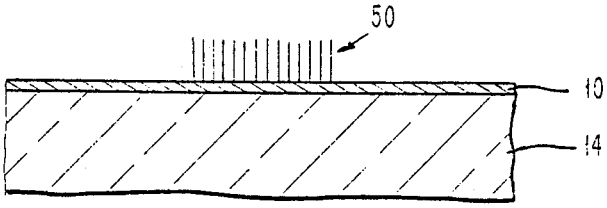

FIG. 5.1
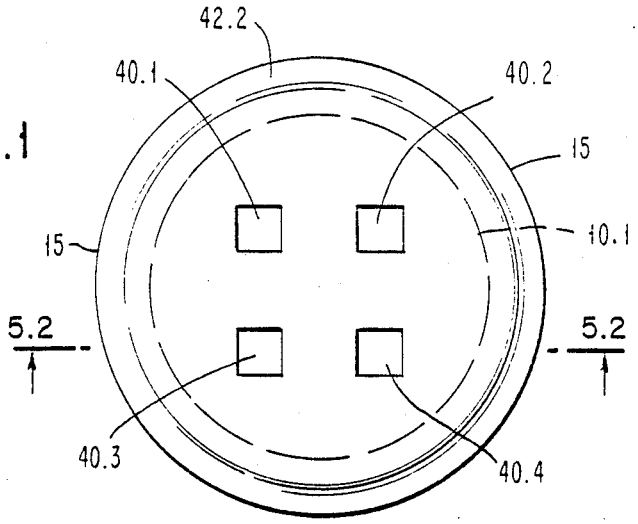
FIG. 5.2
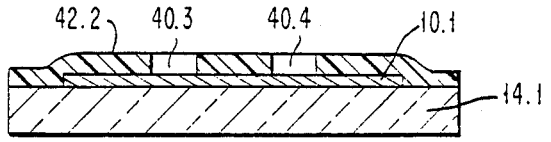
FIG. 5.3
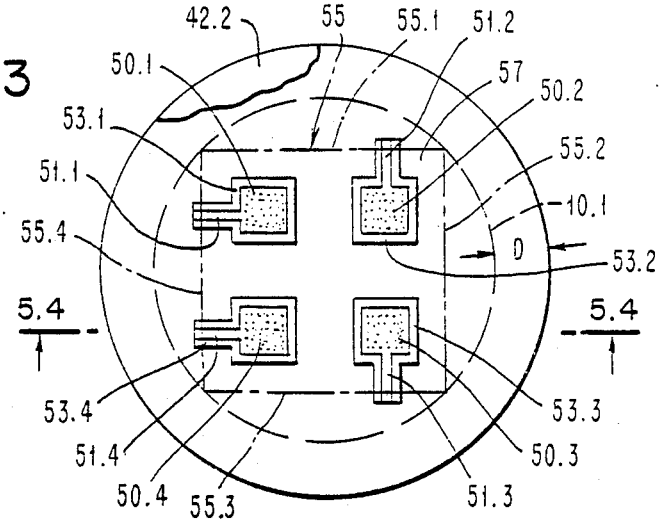
FIG. 5.4
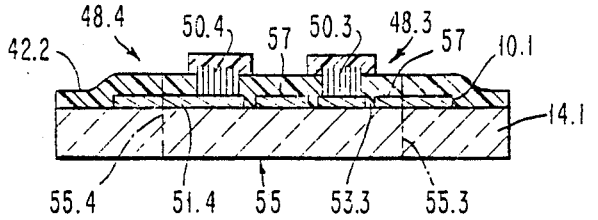

METHOD FOR AND PRODUCT OF ELECTRON EMISSIVE LAYER AND MULTIBEAM CRT THEREBY

This is a continuation of application Ser. No. 612,197, filed May 21, 1984, now abandoned, which is a continuation of application Ser. No. 279,281, filed June 30, 1981, now abandoned.

TECHNICAL FIELD

This invention relates generally to an electron emissive layer for a cathode in a vacuum tube and particularly to such layers for cathodes in a multibeam cathode ray tube.

BACKGROUND ART

Cathodes have been prepared for many years using the alkaline earth oxides of appropriate crystal structures to give electron emission when heated to 700°-1100° C. The oxides are very sensitive to cathode poisoning which is believed to close off the fine porous structure that aids electron emission. For optimum emission, the industry uses controlled composition mixed CaSrBa carbonates, (known as triple carbonate). The carbonate breaks down during the initial heating of the cathode in vacuum during the evacuation and seal-off of the cathode ray tube (CRT) or the vacuum tube. The formation of the oxide sometimes termed thermal activation) from the carbonate, is performed while the excess $Co_2$ is being pumped away. Illustratively, the oxides are sensitive to water vapor which damages the triple oxide crystal structures. Hence, the industry prefers carbonate deposition plus later decomposition to the oxides. Normally, the carbonates for both electron tubes and cathode ray tubes are sprayed or dipcoated onto the cathode structure, and an organic binder is used to make the carbonate particles stick to the cathode metal substrate. These binders are often based on polymethacrylate or nitrocellulose and are chosen because they leave the carbonate crystal morphology intact after they are "burned-off", during the initial heating of the thermal activation step.

A background reference concerning the foregoing is: Handbook of Materials and Techniques for Vacuum Devices, by W. H. Kohl, Reinhold Publishing Corp., 1967.

Very few instances of patterned cathodes have been reported in the background literature. Generally, the design of devices did not require it. Some work has been reported on a photoresist process for patterning triple carbonates. These are various Stanford Research Institute Quarterly Reports on Low Temperature Thermionic Emitter prepared for the NASA on contract 12-607, particularly the Quarterly Report No. 3 dated Nov. 15, 1968, by D. U. Geppert et al which describes cathode coatings on coplanar diode vacuum devices. The method reported in the Quarterly Report, No. 3 provides accurate patterning of triple carbonates. The method uses a negative thin film resist Carbonate particles are loaded into the photoresist (up to 75% solids content) and milled in a ball mill to produce a slurry of appropriate viscosity to be spin coated on a cathode. Typically, 70% CaSrBa carbonate crystals are incorporated into Kodak photoresist and exposed to conventional photo sources. To avoid poor resolution, the mixtures are heavily ball milled. The typical image sizes of fractions of a mil are not adequate for practice of this invention. The Stanford Research Institute loaded photoresist method has several difficulties which restrict the application of the technology to finer limits. Practice of this method has the following attendant problems: (a) difficulty in locating wafer registration marks through opaque resist; (b) poor resolution because of light scattering of solids; (c) difficulty of spinning loaded resists; (d) solid residues left on the developed areas need an undercoat of pure resist to avoid extraneous emission therefrom; (e) there is a layer or residue of the resist layer between emission layer and metal of cathode; (f) as the triple carbonate is in the surface of the resist, it is exposed to contamination e.g., by gasses, causing subsequent loss of emission; (g) and the heavy ball milling of the carbonate particles necessary to reduce the crystal size in order to achieve improved resolution, adversely affects the emission efficiency (large carbonate crystals are used to give open oxide structures).

Triple carbonates of appropriate crystal size can be bought commercially. Background reference is in chapter 16, of the notebook by W. H. Kohl entitled "Cathodes and Heaters". Filamentary cathode emitters which were coated with alkaline-earth carbonates by cataphoresis (cathode deposition by electrophoresis) are described on page 514 of the noted book by Kohl.

Further, delineation of cataphoretically deposited filamentary cathodes by local electrolytic removal of the carbonate was known heretofore. It has been known that: needle crystals of carbonate typically 5-15 microns long and up to a micron in cross-section are particularly good crystal structures for obtaining electron emission and that the needle crystals can be deposited cataphoretically virtually normal with respect to the filamentary surface upon which they were being coated.

The prior art practice has provided microminiature planar cathode-grid structures for vacuum tubes in which the principles of this invention can be beneficially applied. Illustrative of such structures are those disclosed in U.S. Pat. No. 4,138,622 filed Aug. 4, 1977 by J. B. McCormick et al. and issued Feb. 6, 1977 for High Temperature Electronic Gain Device; and U.S. patent application Ser. No. 148,899 filed May 2, 1980 by S. W. Depp and B. Piggin and commonly assigned for Multiple Electron Beam Cathode Ray Tube. The disclosure of this patent application by Depp et al is incorporated herein by reference.

The devices referred to in the aforesaid patent and patent application require triple carbonate patterns precisely and clearly delineated since the grid is virtually in the same plane and on the same substrate surface as the cathode. Any spurious imprecise pattern of carbonate deposition risks anomalous uncontrolled grid emission since the grid is at the same temperature 700°-1100° C. as the cathode metal. The ultimate technological limit of microminiaturization to which these devices can be pushed depends on the critical patterning resolution of the carbonate particles.

SUMMARY OF THE INVENTION

It is an object of this invention to provide an electron emissive structure.

It is another object of this invention to provide a microcathode.

It is another object of this invention to provide microcathodes for a multibeam CRT.

It is another object of this invention to utilize planar technology for fabricating a CRT cathode electron emissive surface.

It is another object of this invention to provide microcathodes for a multibeam CRT.

It is another object of this invention to provide a multibeam CRT by fabricating microarrays of triple carbonate patterns on wafer surfaces.

It is another object of this invention to break down calcium strontium barium carbonate to oxide during the CRT pump off by a forming step.

It is another object of this invention to obtain high emission density from a CRT oxide catbode by utilizing large needle crystals established essentially normal to a substantially planar surface.

It is another object of this invention to provide an encapsulated carbonate structure to minimize or avoid manufacturing environmental damage or poisoning.

It is another object of this invention that the latter encapsulation shall be effectively removed by the initial heating stage of a thermal activation step.

Generally, in accordance with the principles of this invention electrophoresis is used for depositing large needle crystals of triple carbonate to produce good orientation and good crystal packing in an electron emissive layer. It is an open structure with the coherent mass being through the emissive layer and provides beneficial emission densities. The method of this invention uses a positive resist to produce an apertured mask in the areas that require carbonate coating. Large crystal carbonate is electrophoretically coated into the resist apertures and dried. A second thick layer of positive resist is spun over the first layer of resist and the filled aperture. This thick layer is exposed using a larger mask to leave a carbonate pattern fully encapsulated by the first and second resist coats.

More particularly, in the practice of this invention, an ordinary photoresist is patterned as in the manner of silicon technology and used as an electrical stop off to restrict the area where cataphoresis occurs. The requirements of this resist are that it should be a good electrical insulator and be proof against pinholes. It is important there not be a conducting metal layer right up to the edge of the wafer because this is a high field stress point where the resist is thin and spurious cataphoretic deposition occurs out on the edges.

In greater detail, a cataphoretic deposition solution is prepared. Illustratively, this may be done by ball milling carbonate particles, e.g., triple carbonate particles, with a needle structure in an ethyl alcohol liquid for sufficient time that a surface charge appears on the broken crystals. This surface charge is used to make the particles move under the influence of the applied electric field obtained by voltage applied to the workpiece. The deposit fills the apertures in the resist, and of necessity the photoresist is an appropriate electrical insulator. A beneficial resolution is obtained because the particles are standing on end and the cross-section which occupies an area of the surface is a much smaller section than the longitudinal section. Therefore, the resolution will be much higher for equivalent size particles.

Thus, there is accomplished in the practice of this invention cataphoretic coating into an aperture in a mask where the mask is now subject to the photolithography limits of an ordinary transparent film, rather than a carbonate loaded film of the prior art. This yield gives significantly better resolution than with a loaded photoresist. The triple carbonate particles come in end on into the aperture as needle structures which are essentially normal to a planar surface. The cathode structure with the electron emissive layer is obtained in situ in the vacuum tube by heating the encapsulated pattern therein.

A multiple electron beam cathode ray tube for practice of the invention has a plurality of cathodes in a plane positioned on one side of a substrate to form an array. An advantageous embodiment thereof is disclosed in the noted copending and commonly assigned application Ser. No. 148,899 filed May 2, 1980, now U.S. Pat. No. 4,361,781, and commonly assigned, which disclosure is incorporated herein by reference.

Grids in the same plane, i.e., on the surface of the same substrate, are positioned in spaced relation about the cathodes. A heater is associated with the substrate for heating the cathodes. The resultant integrated structure is mechanically stable and operative with small grid-to-cathode voltages, for example, less than 35 volts, and negligible grid currents so that a plurality of individually controlled electron beams are formed when appropriate potentials are applied to the cathodes and grids. The structure can be batch-fabricated with photolithography to accurately define the distance between the cathode and the grid as well as the size of the cathode. The electron emissive layers of the cathodes of a multibeam CRT are obtained in accordance with the principles of this invention.

BRIEF DESCRIPTION OF THE DRAWINGS

FIG. 1 is a functional flowchart showing the steps of the prior art practice utilizing negative resist technology which provides information concerning forming an electron emissive surface.

FIG. 2 is a functional flowchart showing the steps of the method of this invention which provides information showing how the beneficial delineation and characterization of electron emissive surface is achieved by practice of this invention.

FIG. 5 is a series of line diagrams illustrating: a precaution useful for cataphoretically coating several cathodes simultaneously and uniformly with emissive layers in accordance with the principles of this invention; and a resultant chip with a plurality of cathodes with respective electron emissive layers thereon which are encapsulated in accordance with the principles of this invention.

DETAILED DESCRIPTION OF THE DRAWINGS

FIG. 1

Figure 3:
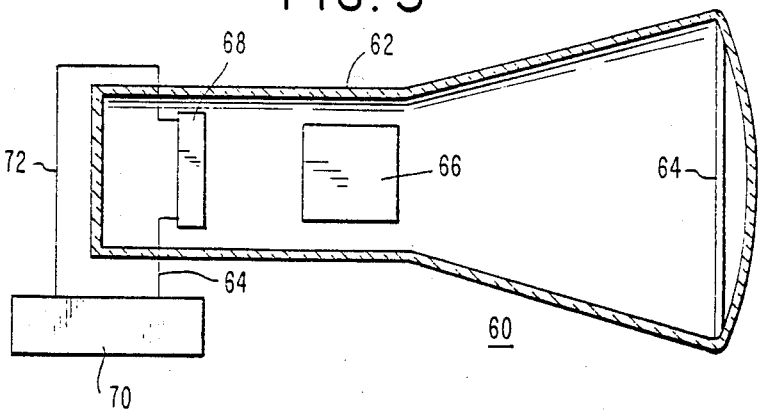
FIG. 3 illustrates a multiple electron beam cathode ray tube for the practice of this invention.

FIG. 1 presents a schematic flow diagram of practice of prior art technology for which practice of the invention hereof is a desirable alternative. Originally, there is for Step I, a metallization layer 10 having outer surface 12 supported by substrate 14 of interface 15. A very thin layer 16 with surface 18 of pure negative photoresist is established in Step II on surface 12 of metallization layer 10. Illustratively, a layer 20 of triple carbonate loaded negative photoresist having outer surface 22 is established on surface 18 of very thin negative resist layer 16. Resist 20 is exposed to a selected pattern via a light mask, not shown, in Step IV leaving the developed pattern 24 in the combined residue of thin layer 16 and triple carbonate loaded photoresist 22 comprising resist 24.1 and carbonate particles 24.2. The boundaries of pattern 24 are: upper surface 26, left boundary 28.1 and right boundary 28.2. Finally, in Step V, by heating, the resist 26.1 is "burnt off" prior to or concurrent with the carbonate breakdown that gives the required CaSrBa oxide pattern 30 on substrate 10.

FIG. 2

The practice of this invention is outlined by FIG. 2 which presents a functional flow diagram of the process of this invention whereby an electron emissive layer is provided. As for the past practice illustrated in FIG. 1, the present practice of the invention is initiated by Step I wherein the cathode substrate 14 supports, at interface 15, a metallization layer 10 with upper surface 12. Though positive photoresist techology, aperture 40 is established in positive photoresist layer 42 having segment 42.1 on the left and segment 42.2 on the right. Aperture 40 defining metallization segment 41 is obtained in Step II by exposing and developing photoresist 42.

In Step III, a pattern 44 of CaSrBa carbonate is cataphoretically deposited in aperture 44. A substantial portion of the carbonate needles 44.1 are aligned essentially perpendicular to metallization segment 41.

A thick capping layer 46 of positive resist is established in Step IV over carbonate pattern 44 and also over the adjacent photoresist 42. Thereafter, in Step V, both positive photoresist layers 46 and 42 are exposed and developed through use of a larger aperture light mask when for Step II, leaving a pedestal 48 comprising side encapsulation 48.2 originally part of layer 42.1, photoresist 48.1 originally layer 46 and carbonate pattern 44. Finally, the Step VI, the photoresist of pedestal 46 is "burnt off" during carbonate decomposition leaving the required CaSrBa oriented oxide pattern 50.

Illustratively, the method for practice of this invention outlined in FIG. 2 has the following advantages:

1. Residual sedimented, or noncataphoretically coated carbonate, is removed during final resist development except for the interface area A.
2. Because of greater photolithographic accuracy, cathode shape is better delineated by use of unloaded positive photoresist and electrophoresis process than by use of a loaded resist technology, e.g., as outlined in FIG. 1.
3. Because cathode coating 50 is in contact with substrate metal, there is better adhesion, and eventually after thermal activation better electrical contact of the semiconducting CaSrBa oxide crystals.
4. Larger crystals 44.1 give better emission than the past method outlined in FIG. 2, because heavy ball milling is not required for photoresolution.
5. Oriented crystals 44.1 give: better emission, structure, open packaging, crystallites from top to bottom of emissive layer, with attendant shape/field enhancement.
6. Because photoresist binder 49.1 is on top of coating 44, better adhesion is obtained to layer 44 during breakdown.
7. Contamination is avoided during inclusion in the vacuum tube because of the encapsulation material 48.1.
8. Encapsulated cathode material allows more rugged handling of the cathode structure. This allows or helps subsequent wafer operations after carbonate coating such as, welding, scribing, and dicing.

FIG. 3

In FIG. 3, the multiple electron beam cathode ray tube 60 for practice of the invention has an envelope 62, fluorescent screen 64, means 66 for accelerating, focussing and deflecting electron beams, an integral structure 68 which is described in connection with FIG. 4 and which is situated in the neck portion of envelope 62. As schematically illustrated, the integral structure 68 is connected to a source 70 of electrical input signals by a plurality of wires 72 and 74.

FIG. 4

Figure 4:
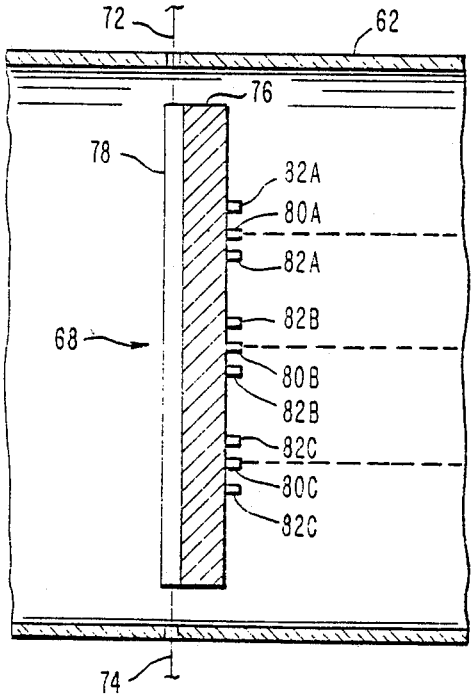
FIG. 4 is a fragmentary cross-sectional view showing an integral cathode array-grid structure for practice of this invention in the cathode ray tube of FIG. 3.

The integral assembly 68 is illustrated in detail in FIG. 4. The assembly 68 has a substrate 76 of a high temperature insulator, such as sapphire, with good thermal conductivity. On the back surface of the substrate 76 is a thin film heater 78 made from a resistive, refractory metal, such as tungsten or molybedenum. Positioned on the front surface of the substrate 76 are an array of cathodes 80A, B, C, that are surrounded by modulating grids 82A, B, C, respectively. The array of cathodes 80A–C and grids 82A–C are on the same surface which is in a single plane. The cathodes 80A–C and the grids 82A–C need to be on the same surface but it is not essential that the surface be planar. The cathodes 80A–C could be recessed with respect to the grids 82A–C. One of the wires from the plurality of wires 72 goes from the source 70 to the heater 78 and one of the wires 74 goes from the heater 78 to the source 70. The wires from wire bundles 72 and 74 which go to the cathode arrays 80A–C and to the grid areas 82A–C are not shown. The electrical connections to the cathode and grid are shown in FIG. 3.

The integral structure 68 can be batch-fabricated with photolithographic process steps. Illustratively, the cathodes 80A through 80C are deposited on the front surface of substrate 78 as a thin film of molybdenum, tungsten, platinum or other suitable refractory material and then defined by conventional photolithographic techniques. The cathode areas are then made electron-emitting by delineating a mixture of photoresist and carbonates of strontium, barium and calcium in those regions in accordance with the principles of this invention. When the substrate is heated in a vacuum to a temperature of approximately 1000° C., the photoresist volatilizes at about 500° C. leaving the cathodes 80A–C electron emitting and capable of being activated in the usual manner by applying the appropriate voltage. This batch-fabrication method is capable of very fine dimensional control providing the capability of making cathode and grid lines as small as 10 microns in width.

In operation, the thin film heater 78 heats the substrate 76 to a temperature of the order of 700° C. so that sufficient electron emission takes place. The cathodes 80 are then individually biased with respect to the grid electrodes 82 to either cut off or turn on. Alternatively, adjacent grid electrodes, for example, 82B and 82C, may be replaced by a single grid electrode.

FIG. 5

FIG. 5 is illustrative of an approach of getting several cathodes commonly connected electrically during the cataphoresis of the triple carbonate. For mass production, the conventional integrated circuit wafer chip approaches of silicon are utilized. The electrical circuits which comprise the cathodes must be electrically isolated from the grids for device operation. However, in order to perform catephoretic coating, all the cathodes on the chip should be electrically connected in common. Otherwise individual contacting of each cathode is required on opposite edges of the chip. There can be obtained a grid connection from one chip to the cathode pad on the next chip which occurs between every pair of chips on the wafer. Thus, the adjacent chips are used to provide the electrical connection mechanism, for commoning up all the cathodes on one chip. When the chips are separated, the connections that go from a cathode pad to the adjacent grid are broken, thereby providing the isolation which is necessary for each cathode from each grid in the use of the device as a cathode ray tube.

FIG. 5 illustrates, in accordance with the principles of this invention, technology for catephorically coating a plurality of cathodes. FIG. 5.1, shown in cross-section in FIG. 5.2, shows apertures 40.1 to 40.4 in photoresist layer 42.2 ready to be filled by catephoresis with needle-like particles of carbonate. Metallization layer 10.1 is back from edge 15 of substrate 14.1 by a distance D. When the catephoresis is achieved, by having the metallization 10.1 back a distance D from the edge of the sapphire substrate 14.1 with resist over the entire surface, there is no sharp edge to gain and intensify the electric field. Therefore, the electric field is uniform over the cathode areas 40.1 to 40.4 and the process of depositing the electron emissive layers can be quantified both as to time and current. FIG. 5.3, shown in cross-section in FIG. 5.4 shows essentially the consequence of FIG. 2.4 for multiple cathodes. FIG. 5.3 shows moats 53.1 to 53.4 around emission layers 50.1 to 50.4 and leads 51.1 to 51.4 respectively. Ultimate chip 55 is defined by boundaries 55.1 to 55.4. Remaining metallization 57 will serve as an exemplary grid for a CRT per FIGS. 3 and 4. It may also be partitioned into separate grids per the discussion hereinbefore. After preparation of ultimate chip 55, it becomes chip 55 by severing it along boundaries 55.1 to 55.4 from the remainder of substrate 14.1 and metallization 10.1. In FIG. 5.3, in which numbers are related somewhat to FIG. 2, the sapphire substrate 14.1 has the metallization 10.1 thereon back from the edge 15 by distance D. In chip region 55, four cathode regions 50.1 to 50.4 are shown. Each of them has a conductor 51.1 to 51.4 to the edge of the chip. Each cathode substrate and lead on the chip 55 is surrounded by a nonconductive region, e.g., cathode 50.1 and lead 51.1 is surrounded by a nonconductive region 53.1.

Encapsulations 48.1 to 48.4 encapsulate electron emissive layers 50.1 to 50.4 in accordance with the practice illustrated in FIG. 2.5. Once chip 55 is severed along boundaries from the remainders of substrate 14.1 and metallization 10.1, it is a product provided in accordance with the principles and practice of this invention.

As disclosed and illustrated in the copending application Ser. No. 148,899, now U.S. Pat. No. 4,361,781, incorporated herein by reference, on the surface of the substrate the electrodes are connected to bonding pads respectively. This permits each one of the electrodes to be individually controlled. The grids are all connected to the grid bonding pad thereby resulting in a potential to the grid which is constant. Another multibeam embodiment with which this invention may be practiced has the grids individually connected to separate bonding pads so that the potential to each grid can be individually controlled. The potentials may be individually modulated between each cathode and the grid immediately surrounding that cathode. This may be done by maintaining the grid constant and individually controlling the cathode potentials, by maintaining the cathode potential constant and individually varying the grids, or by individually controlling the potential of each cathode and the potential of each grid.

The configuration of each planar grid for each cathode may be in the shape of a C that surrounds a circular cathode. Another geometry of a grid-cathode design, one of which cathodes are in the form of a cross and a planar grid surrounds a plurality of cathodes.

The geometry of a multibeam CRT described hereinabove and illustrated by the drawings and the method of fabrication thereof have a number of advantages. The use of photolithography defines the critical dimensions between the cathode and for fabrication of cathodes and grids of a multibeam CRT for the practice of this invention the grids which determine the electron gain as well as providing high resolution cathodes. The small grid-cathode spacing achievable with photolithography gives a large transconductance and small grid-to-cathode voltages. The coplanar grid provides a rugged construction with no microphonics and with very little if any grid current. The cathode/grid and heaters are fabricated as one integrated assembly which is a mechanically stable structure. In addition, the use of photolithography allows many cathode-grid arrays to be fabricated at the same time thereby resulting in a substantially lower cost per unit.

CONSIDERATIONS FOR THE INVENTION

Suspensions for electrophoresis for practice of this invention are prepared in many ways. The essential feature is to get a charge onto the surface of the particle. This is usually achieved by ball milling the triple carbonate in a solvent of low electrical conductivity in the presence of a slight amount of freely ionized additive. As the crystals break due to milling, the highly reactive fresh breakage surface created adsorbs the ions. This gives a charged particle capable of being moved and deposited by electrophoresis. A recipe an electrophoretic cathode carbonate suspension will now be described.

Pour 200 to 250 millileters of 80% ethyl alcohol and 20% methyl alcohol into a one-pint porcelain mixing jar and add a ball charge of 30 to 38 grams (9 to 11 balls). Add the 10 to 15 grams of coating precipitate, seal the jar and place into mixing equipment for 24 hours to 48 hours at 67 r.p.m. Remove the mixing jar from the mixing equipment. The coating precipitate is left in suspension with the industrial spirit inside this jar and is shaken up before use. The quantities referred to will yield approximately 50 grams of coating precipitate.

The ions may be supplied by the limited solubility of the carbonate precipitate in the nonconducting solvent. Pure demineralized distilled water, methyl ethyl alcohols or organic estere can be used as insulating dispersants.

The suspension example cited hereinbefore coats cataphoretically at between 10 V to 100 V per time period of 3 secs to 30 secs. The exact voltage and time are determined experimentally. Smooth deposits are achieved by the use of lower voltages. Needle-shaped particles in accordance with the principles of this invention, which are very beneficial as cathode sources, have the added advantage that they deposit in a way that gives an oriented deposit with the long axis virtually normal to the surface being coated. The catephoretic-deposit is quite soft and easily damaged. Heretofore, it was known to add an adhesion promoter, such as barium formate solution in water. The deposit is dipped into the solution and then dried. Alternatively, a small percentage, e.g., 2% to 5% of barium formate may be milled into the initial electrophoretic suspension. The barium formate is chosen because it melts and decomposes to barium carbonate. In so doing, it promotes adhesion of carbonate particle to particle and to the cathode substrate without loading the cathode coating with poisons or diluents.

A conventional photolithography resist mask is established in FIG. 2.2 over the planar grid/cathode patterned insulating wafer substrate of FIG. 2.1. Illustratively, this is a sapphire wafer evaporated with metallization tungsten 4000 Å and titanium 1000 Å. In FIG. 2.2 the positive photoresist has insulating property. Novalac resins are so insulating.

A voltage source (not shown) is connected in FIG. 2.3 to the cathode metal to fill cataphoretically the apertures in the resist image, for example, 25 Volts for 5 secs.

Illustratively, the cataphoretic deposition of FIG. 2.3 is baked at 80° C. for 5 mins.

Illustratively, the cataphoretic is dipped in barium formate saturated water solution and rebaked to promote adhesion of carbonate particles to each other and to the substrate.

Having thus described my invention, what I claim as new, and desire to secure by Letters Patent is:

1. A cathode comprising:

an insulating substrate;

a metallization layer on said substrate having an essentially planar surface;

an electron emissive layer on said metallization comprising an array of needle-like particles essentially normal to said metallization surface.

* * * * *